United States Patent [19]

Otto

[11] Patent Number: 5,024,449

[45] Date of Patent: Jun. 18, 1991

[54] SEAL ASSEMBLY FOR USE WITH AN OVERHANG

[75] Inventor: Dennis L. Otto, Carroll County, Ohio

[73] Assignee: The Timken Company, Canton, Ohio

[21] Appl. No.: 334,448

[22] Filed: Apr. 6, 1989

Related U.S. Application Data

[63] Continuation-in-part of Ser. No. 124,814, Nov. 23, 1987, Pat. No. 4,819,949, which is a continuation-in-part of Ser. No. 79,175, Jul. 29, 1987, Pat. No. 4,770,548, which is a continuation of Ser. No. 811,657, Dec. 19, 1985, abandoned.

[51] Int. Cl.⁵ .......................... F16J 15/32; F16J 15/34
[52] U.S. Cl. ..................................... 277/37; 277/134; 277/152; 384/485; 384/486
[58] Field of Search .................. 277/3, 25, 37, 38, 65, 277/85, 134, 135, 153, 212 R, 212 F, 215, 67, 152; 384/480, 486, 489, 484, 485

[56] References Cited

U.S. PATENT DOCUMENTS

| | | | |
|---|---|---|---|
| 3,021,161 | 2/1962 | Rhoads et al. | 277/153 X |
| 3,363,911 | 1/1968 | McKinven, Jr. | 277/65 |
| 3,363,952 | 1/1968 | Paterson | 277/153 X |
| 3,494,681 | 2/1970 | Anderson . | |
| 3,519,316 | 7/1970 | Gothberg . | |
| 3,628,837 | 12/1971 | Otto . | |
| 3,639,016 | 2/1972 | Bourgeois . | |
| 3,790,178 | 2/1974 | Cameron . | |
| 4,252,329 | 2/1981 | Messenger | 277/153 X |
| 4,283,064 | 8/1981 | Staab et al. . | |
| 4,448,461 | 5/1984 | Otto . | |
| 4,513,976 | 4/1985 | Bentley et al. | 277/25 |
| 4,522,411 | 6/1985 | Burgan . | |
| 4,522,515 | 6/1985 | Miki et al. . | |
| 4,578,856 | 4/1986 | Butler . | |
| 4,676,671 | 6/1987 | Gössman | 384/480 X |
| 4,721,312 | 1/1988 | Hornberger | 277/37 |
| 4,792,242 | 12/1988 | Colanzi et al. | 384/480 X |
| 4,792,243 | 12/1988 | Takeuchi | 277/135 X |

FOREIGN PATENT DOCUMENTS

| | | |
|---|---|---|
| 65887 | 12/1982 | European Pat. Off. . |
| 2419655 | 10/1979 | France . |
| 2540955 | 8/1984 | France . |

Primary Examiner—William A. Cuchlinski, Jr.
Assistant Examiner—Scott Cummings
Attorney, Agent, or Firm—Gravely, Lieder & Woodruff

[57] ABSTRACT

A seal is particularly suited for closing the ends of an antifriction bearing which is located on a journal where its inner races are captured between wear rings and backing elements having overhangs which are directed back toward the end of the bearings and, as such, encircle the wear rings. Indeed, a seal exists at each end of the bearing for isolating the annular space between the inner and outer races of the bearing. Each seal includes a case that is fitted into the end of the outer race and projects axially from that race as well as radially inwardly toward the wear ring. In addition, it has two elastomeric lips which are presented toward the wear ring, one being configured primarily to retain lubricant in the annular space between the two races of the bearing and the other to exclude contaminants from that space. The seal also has an elastomeric spray shield which is attached to the case and projects radially outwardly from it toward the overhang. Indeed, the inwardly presented surface of the overhang deflects the shield back toward the end of the bearing. The elastomer of the shield may have low resistance to abrasion, in which case, it wears away until it offers very little resistance to rotation, or it may have a high compression set, in which case, it acquires a permanent deformation and again offers very little resistance to rotation.

18 Claims, 2 Drawing Sheets

SEAL ASSEMBLY FOR USE WITH AN OVERHANG

RELATED APPLICATIONS

This application is a continuation-in-part of application Ser. No. 124,814, filed Nov. 23, 1987 now U.S. Pat. No. 4,819,949, which is a continuation-in-part of application Ser. No. 79,175, filed July 29, 1987 now U.S. Pat. No. 4,770,548 which in turn is a continuation of application Ser. No. 811,657, filed Dec. 19, 1985 now abandoned.

BACKGROUND OF THE INVENTION

This invention relates in general to sealing shafts and the like and, more particularly, to a seal that is particularly adapted for use with an overhang that encircles it.

A type of antifriction bearing, known as an all-purpose bearing, exists which is furnished as a sealed self-contained assembly that is preset and prelubricated. As such, the bearing is simply fitted over an axle journal and into a housing to enable the axle to rotate relative to the housing or vice-versa. All-purpose bearings have experienced wide-spread use on axles of railway cars, but they are also used in other applications, such as for crane wheels, table rolls and shears, and even for the work rolls of rolling mills.

All-purpose bearings often operate in hostile environments, and this is particularly true when they are used at the journals of railway cars. Here they are subjected to contaminants, such as moisture and road grit, which must remain out of the interiors of the bearings to prevent premature failure. Hence, the presence of seals at the ends of all-purpose bearings.

The typical seal for an all-purpose bearing has a seal case which is fitted into an end of the outer race for the bearing and an elastomeric seal element which is bonded to the seal case and bears against a wear ring at the end of the corresponding inner race for the bearing. Actually, the seal element contacts the wear ring at two axially spaced locations, namely along a primary lip that is on the so-called oil side of the seal and also along dust or secondary lip that is on the air side. A garter spring encircles the primary lip to urge it snugly against the wear ring, where it is supported on a thin, yet continuous, film of lubricant known as an elastohydrodynamic oil film. The dust lip likewise bears against the wear ring, but merely under the bias of the elastomer from which the seal element is molded. Indeed, a separate seal and wear ring exists at each end of the typical all-purpose bearing.

In some installations where all-purpose bearings are used, the seals at the ends of those bearings are further protected by overhangs which project axially from backing members between which the bearing is clamped and encircle the wear rings. For example, on the typical journal for a rail car axle, the wear ring at the inboard end of the bearing bears against a cone backing ring that fits snugly against a shoulder at the inboard end of the journal, whereas the wear ring at the outboard end fits against an end cap that extends across the end face of the journal. Some backing rings and end caps have overhangs which project axially around the seals that encircle the wear ring against which they fit. The overhangs create a more tortuous route for contaminants to enter the bearing, and inasmuch as they rotate with the axle journal, they propel water and other contaminants away from the seals.

Whereas, the overhangs used with conventional all-purpose bearings are separate and apart from the seals which they protect, the seal of the present invention actually cooperates with the overhangs to establish additional barriers to the ingress of contaminants. Yet, the seal requires no special or additional procedures for assembling the bearing, nor does it impose any additional torque or drag during operation of the bearing.

DESCRIPTION OF THE DRAWING

In the accompanying drawings which form part of the specification and wherein like numerals and letters refer to like parts wherever they occur

DETAILED DESCRIPTION

Referring now to the drawings, a self-contained bearing A (FIG. 1), which is prelubricated and preset, fits around a journal 2 on the end of an axle 4 and is received in an adapter or some other containing structure 6, all for the purpose of permitting the axle 4 to rotate easily with respect to the containing structure 6 about an axis x of rotation. Actually, the bearing A is clamped on the journal 2 between two backing members—namely, a backing ring 8 and an end cap 10, the latter being urged toward the former by cap screws 12 which thread into the end of the journal 2. Neither the ring 8 nor the cap 10 bears directly against the bearing A, but instead they exert the axially directed clamping force through wear rings 14 that likewise encircle the journal 2. The rings 14 have outwardly presented sealing surfaces 15 (FIG. 2) of cylindrical configuration which are located immediately beyond the ends of the bearing A. Those ends are closed by seals B, which cooperate with the wear rings 14 and backing members 8 and 10 to create barriers which serve to retain a lubricant in the interior of the bearing A and exclude contaminants. The foregoing constitutes a journal assembly J.

Both the backing ring 8 and the end cap 10 are preferably cast or forged and thereafter machined to accommodate the ends of the wear rings 14. Each has a generally radially directed surface 16 (FIG. 2) that faces the end of the bearing A and an overhang 18 which projects axially from the surface 16, so as to encircle the adjacent wear ring 14, yet is spaced radially from that wear ring 14. Each overhang 18 has an inwardly presented surface 19 of generally cylindrical configuration that is presented toward the wear ring 14. The surface 19 may be left as cast or forged, in which event it is relatively rough, or it may be turned down in a machining operation to a smoother and more cylindrical condition, or it may even be ground to a very smooth and almost polished condition.

Briefly considering the bearing A first, it includes (FIG. 1) a double cup 20 having a pair of inwardly presented raceways 22 and, at the large diameter ends of those raceways 22, cylindrical counterbores 24 which run out to the ends of the cup 20. It is across these ends that the bearing A is held within the containing structure 6. The cup 20 surrounds a pair of cones 26 which fit around the axle journal 2 where they are separated by a spacer 32. Each cone 8 has a tapered raceway 28 which faces, and indeed is encircled, by one of the cup raceways 22, and that cone raceway 28 leads out to a thrust rib 30 which in turn ends at a back face. The spacer rings 14 bear against the cones 26 at the cone back faces, and hold the two cones 28 and the spacer 32 tightly together. The cup 20 and cones 26 are concentric about the axis x of rotation, and, whereas the cones 26 rotate with the journal 2, the cup 20 remains stationary in the containing structure 6.

In addition to the double cup 20 and the two cones 26, the bearing A has tapered rollers 34 (FIG. 1) which are arranged in two rows corresponding to the sets of opposed raceways 22 and 28 on the cup 20 and cones 26. Thus, a separate row of rollers 34 surrounds each cone 26. Along their large end faces, the rollers 34 abut the thrust ribs 30 for their respective cones 26, so that the thrust ribs 30 prevent the rollers 34 from being expelled from the spaces between the raceways 22 and 28 when the bearing A is subjected to radial loads. Each row of rollers 34 carries a cage 36 which maintains the proper spacing between adjacent rollers 34 of that row, and further, holds the rollers 34 of that row around the cone 26 when the cone 26 is removed from the cup 20. The tapered rollers 34 of the two rows and the cages 36 for those rollers 34 move within an isolated annular cavity 38 which is closed at its ends by the seals B.

Figure 1:
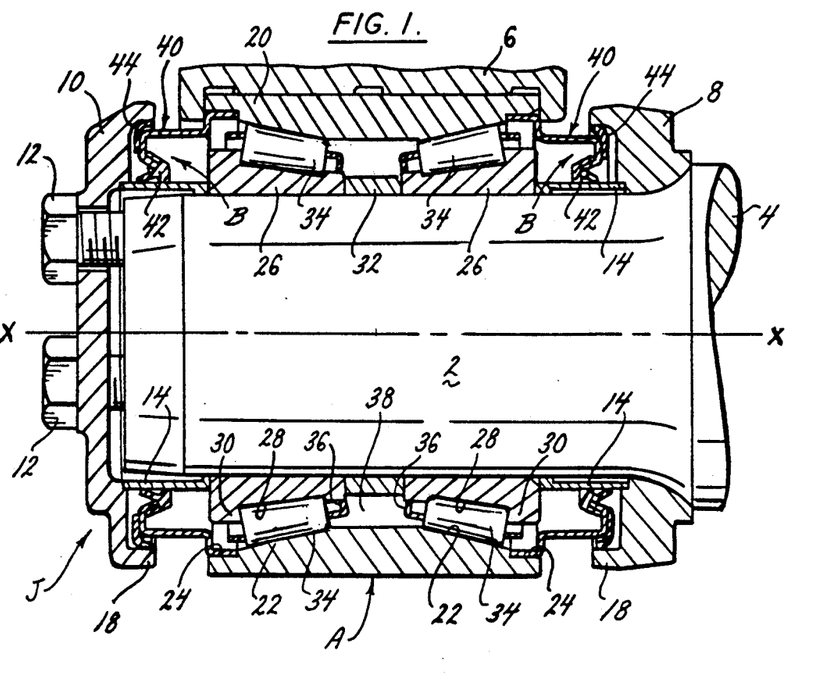
FIG. 1 is a sectional view of an all-purpose bearing mounted on an axle journal and provided at its ends with seals constructed in accordance with and embodying the present invention.

In the operation of the bearing A, the tapered rollers 34 in the two rows move along the raceways 22 and 28, and to reduce friction, particularly between the large end faces of the rollers 34 and the thrust ribs 30 of the two cones 26, a supply of grease-type lubricant exists within the annular cavity 38. Indeed, the tapered rollers 34 tend to pump the lubricant toward the thrust ribs 30. The seals B generally occupy the annular spaces between the surfaces of the cup counterbores 6 and the rings 14 that are located beyond the cone thrust ribs 30. The seals B establish barriers along the wear rings 14 and overhangs 18, barriers which retain the lubricant within the annular cavity 38 between the cup 20 and cones 26 and further exclude dirt, water, and other contaminants from it. Thus, the seals B serve to isolate the annular cavity 38 for the surrounding environment. Even so, seals B require little torque to overcome the friction that is inherent in them. Since the cavity 38 contains the tapered rollers 34, it experiences wide variations in temperature, but these variations do not significantly affect the pressure within the cavity 38, since the seals B further provide a vent for the cavity 38.

Figure 6:
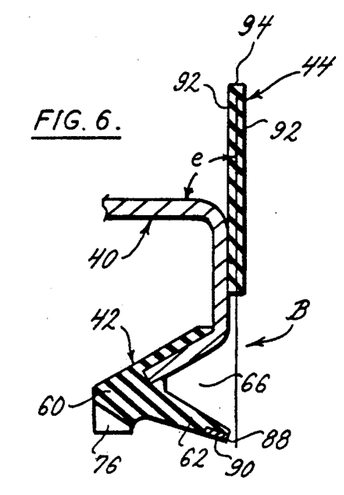
FIG. 6 is an enlarged sectional view of the seal with its spray shield undeflected.

Each seal B includes (FIGS. 2 and 6) a rigid seal case 40 which projects from one end of the double cup 20 where it encircles the wear ring 14 that projects beyond that end of the cup 20, a flexible seal element 42 which is carried by the case 40 and projects radially inwardly toward the wear ring 14, and a flexible spray shield 44 which is likewise carried by the case 40, but projects radially outwardly toward the surrounding overhang 18. The seal case 40 is preferably formed from steel as a stamping. The flexible seal element 42, on the other hand, is preferably formed from an elastomer and is attached to the case 40 preferably by molding the elastomer directly against the case 40. The shield 44 is likewise preferably formed from an elastomer, either separately from or directly against the seal case 40, but in any event it is attached to the seal case 40.

Turning now to the seal case 40, it includes (FIG. 2) a cylindrical mounting portion 50, a stepped intermediate portion 52, a radial portion 54, and an oblique portion 56. The mounting portion 50 fits into the counterbore 24 of the double cup 20 where it interlocks with the cup 20 to effect a firm securement and a static seal. Immediately beyond the end of the cup 20, the mounting portion 50 merges into the stepped intermediate portion 52 which is of a lesser diameter and provides a shoulder against which an axially directed force may be applied to the seal case 40 to press the mounting portion 50 into the counterbore 24 of the cup 2. The intermediate portion 52 is spaced outwardly from the thrust rib 30 of the cone 26 at that end of the bearing A from which it extends, and projects partially over the wear ring 14 which extends beyond that cone 26. Indeed, it extends into the overhang 18 that likewise encircles the ring 14. Within the overhang 18, the intermediate portion 52 merges into the radial portion 54, which turns inwardly toward the wear ring 14. The radial portion 54 in turn merges into the oblique portion 56 which turns backwardly toward the cone 26 at an oblique angle with respect to the axis x, yet its inner edge is spaced from the sealing surface 15 of wear ring 14.

The seal element 42, which is preferably molded from an elastomer, but may be formed from other flexible materials such as polymers, includes (FIG. 2) a primary lip 60 and a secondary or dirt lip 62, both of which are presented toward the sealing surfaces 15 of the wear ring 14, with the former further being on the so-called oil side, that is, presented toward and exposed to the cavity 38, whereas the latter is on the air side. Between the primary lip 60 and the free end of the dirt lip 62 is a shallow annular groove 64 which opens toward the sealing surface 15. Between the dirt lip 62 and the oblique portion 56 of the seal case 40 exists a much larger and deeper annular groove 66 which opens toward the radial surface 16 of the backing ring 8 or end cap 10, whatever the case may be.

Considering the primary lip 60 first (FIGS. 2–4), it turns radially inwardly and terminates at a circumferential or cylindrical face 70 which is presented toward, but is slightly greater in diameter than, the sealing surface 15 of the wear ring 14. As a consequence, a slight radial clearance c exists between the sealing surface 15 and the face 70, and this clearance typically could range between 0.002 and 0.040 inches, this being a working clearance since some eccentricity between the primary lip 60 and sealing surface 15 may exist as the result of manufacturing tolerances. On one side of the cylindrical face 70 is an inner end face 72 which is presented toward the sealed cavity 38, and on the other side is an outer end face 74 which is presented toward the dirt lip 62. Both faces are radial, that is they lie in planes which are generally perpendicular to the bearing axis x, and hence they are parallel to each other. Neither the cylindrical face 70 nor the inner end face 72 is continuous, but instead both are interrupted by small pockets or cavities 76 which are configured to pump or impel lubricant that enters them back toward the tapered rollers 34, that is, back into the sealed cavity 38, at least when relative rotation occurs between the primary lip 60 and the wear ring 14. The pumping cavities 76 are arranged at equal circumferential intervals along the primary lip 60, with each cavity 76 opening out of both the cylindrical face 70 and the inner end face 72 of the primary lip 60 and interrupting the edge at which those faces intersect. To effect the pumping or impelling action, each pumping cavity 76 has a pair of side faces 78 (FIGS. 3 & 4) which are located at equal angles d with respect to the direction k of relative rotation between the lip 34 and sealing surface 14. The angle d should be between 30 degrees and 60 degrees and should preferably be 45 degrees. Thus, the side faces 54 intersect the cylindrical face 46 along lines which are oblique to the direction of relative rotation k between the primary lip 60 and the sealing surface 15, which is, of course, the circumferential direction. Completing the cavity 76 is an outside connecting face 80 which extends between the two side faces 78 and is oriented at an oblique angle with respect to the cylindrical face 70, it being farthest from the cylindrical face 70 at the inner end face 72. The two side faces 78 are planar, while the connecting face 80 may be planar or perhaps slightly concave. All three of the faces 78 and 80 intersect the outer end face 74, with the lines of intersection for the side faces 78 being spaced slightly apart and the line of intersection for the connecting face 80 being located outwardly from the cylindrical face 70. The result is a small vent aperture 82 that opens out of the outer end face 74 toward the dust lip 62, that aperture of course being at the small end of its pumping cavity 76.

Figure 2:
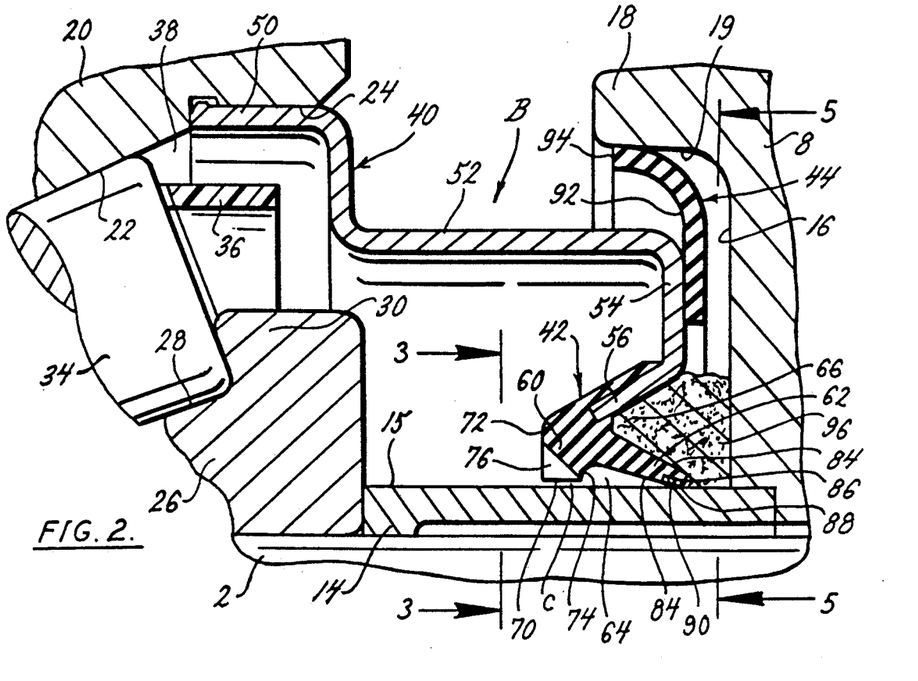
FIG. 2 is an enlarged fragmentary sectional view of one of the seals and the structure which cooperates with it to establish barriers that isolate the interior of a bearing.
Figures 3, 4, 5:
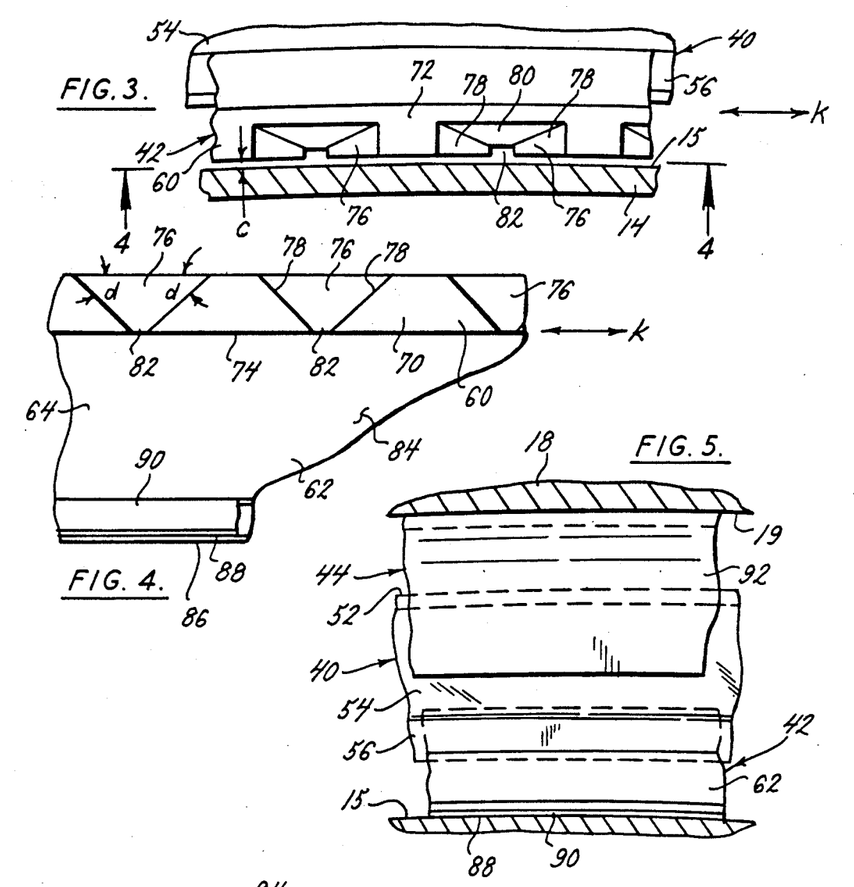
FIG. 3 is a fragmentary sectional view of the seal taken along line 3—3 of FIG. 2.
FIG. 4 is a fragmentary view of the seal taken along line 4—4 of FIG. 3 and showing the face of the primary lip and the pumping elements which open out of that face.
FIG. 5 is a fragmentary end view of the seal taken along line 5—5 of FIG. 2.

When the cone 26 rotates, lubricant that is between the sealing surface 15 of the wear ring 14 and the cylindrical face 70 of the primary lip 60 migrates into the pumping cavities 76 where it is deflected generally axially by the side faces 78. Actually, the rotation of the wear ring 14 not only causes the lubricant to flow into each cavity 76, but further causes it to come against one side face 78 of each cavity 76, and that side face 78, being at the angle d with respect to the direction k of relative rotation, which is of course the circumferential direction, deflects the lubricant back toward the sealed cavity 38 and the tapered rollers 34 within it. The connecting face 80, inasmuch as it is oblique to the axis x, also deflects lubricant back toward the sealed cavity 38 and allows lubricant, when subjected to the centrifugal forces generated by rotation of cone 26, to flow outwardly away from the axis x of rotation as the lubricant moves into the sealed cavity 38. By reason of their wedge-shaped configurations, the pumping cavities 76 will deflect the lubricant in the same axial direction, irrespective of the direction that the cone 26 rotates, and also irrespective of whether the cone 26 or cup 20 is the rotating race of the bearing A. In this regard, in one direction of rotation one side face 78 and the connecting face 80 of each cavity 76 will deflect the lubricant back toward the sealed cavity 38 that represents the interior of the bearing A, and in the other direction of rotation, the other side face 78 and connecting face 80 will likewise deflect the lubricant, again axially back toward the sealed cavity 38. The vent apertures 82 at the ends of the cavities 76, along with the clearance c between the cylindrical face 70 and the sealing surface 15, prevent the sealed cavity 38 from experiencing a significant increase in pressure. Being separated from the wear ring 14, the primary lip 60 experiences no wear.

The dirt lip 62 projects away from the primary lip 60, generally toward the radial surface 16 of the backing ring 8 or end cap 10, but nevertheless, contacts the wear ring 14 at the sealing surface 15 on it. The lip 62 has a pair of slightly convergent side faces 84 and an end face 86, as well as a sealing edge 88 where the inner of the two sides faces 84 and the end face 86 come together. For the most part, the dirt lip 62 is formed from the elastomer of the seal element 42 as an integral part of that element, but embedded in its end is an annular insert 90 which is formed from a flexible polymer, such as polytetrafluoroethylene (PTFE). The sealing edge 88 exists along the insert 90 which is more resistant to wear than is the elastomer in the remainder of the lip 62. When the lip 62 is unrestrained, its diameter along the sealing edge 88 of the insert 90 is less than the diameter of the cylindrical face 70 on the primary lip 60 and also slightly less than the diameter of the sealing surface 15 for wear ring 14.

The dirt lip 62 fits around and bears against the sealing surface 15 of the wear ring 14. Having been expanded slightly to pass over the surface 15, it snugly embraces and is biased against the sealing surface 15. The sealing edge 88 is lubricated so that excessive friction does not develop between it and the surface 15. Indeed, the lubricant within the annular cavity 38 of the bearing A serves as a source for replenishing the lubricant along the sealing edge 88. In this regard, some lubricant from the cavity 38 will flow through the clearance between the primary lip 60 and the sealing surface 15 when the bearing A is at rest or is operating at a very low speed, and this lubricant lubricates the sealing edge 88, but the lubricant does not go beyond the sealing edge 88 during normal operation of the bearing A. Should the annular cavity 38 experience a quick rise in pressure, which may result from an increase in the temperature of the bearing, that increase in pressure will be transmitted through the clearance c and the vent apertures 80 to the underside of the dirt lip 62. If the rate of rise in pressure is great enough, the lip 62 may separate from the sealing surface 15 and vent the cavity 38. While this may result in the loss of some lubricant, it prevents the seal A from sustaining damage. Once the pressure is relieved, the lip 62 returns to its original configuration.

Whereas the dirt lip 62 extends obliquely toward the wear ring 14 against which it bears, the spray shield 44 extends generally away from the wear ring 14 and, indeed, toward the encircling overhang 18, to establish yet another barrier which is along the inwardly presented surface 19 of the overhang 18 (FIGS. 2 and 5). In its initial or unrestrained configuration (FIG. 6), the shield 44 resembles a flat wather and, indeed, is molded as such, either against the radial portion 54 of the seal case 40 or as a separate element which is thereafter bonded to the radial portion 54. Thus, the shield 44 has parallel side faces 92, which initially assume a radial orientation with respect to axis x, and a peripheral surface 94 which represents the farthest extension of the shield 44, at least when unrestrained. A plane located intermediate the side surfaces 92 will, of course, intersect the axis x and the angle between the two on the inside of the seal B represents the effective angle e of the shield 44. The angle e should not be more than about 90°. From its bond along the radial portion 54 of the seal case 40, the shield 44 projects radially outwardly beyond the mounting portion 50 of the case 40, and indeed, its peripheral surface 94 possesses a diameter greater than the diameter of the inwardly presented surface 19 on the overhang 18.

Thus, when bearing A is installed on the axle journal 2, the overhang 18 of the cone backing ring 8 deflects the shield 44 of the inboard seal B somewhat axially toward the inboard end of the bearing A. Thereafter, when the end cap 10 is placed over end face of the journal 2, its overhang 18 deflects the shield 44 of the outboard seal B somewhat axially toward the outboard end of the bearing A. At this point, both shields 44 bear against the inwardly presented surfaces 19 of their respective overhangs 18 and as such are directed away from radial surfaces 16 with which those inwardly presented surfaces 19 merge. The extent of the deflection, of course, depends on the diameter of the peripheral surface 94 of the shield 44 and the diameter of the inwardly presented surface 19 of the overhang 18, and the latter may vary, depending on the manufacture of the backing ring 8 and end cap 10 and whether or not overhangs 18 on them have undergone any machining.

In any event, the shields 44 of the two seals B initially bear against the inwardly presented surfaces 19 on the overhangs 18 of the cone backing ring 8 and end cap 10. Depending on the elastomer from which the shield 44 is formed, the contact may remain or, after a short duration of operation, may become negligible. Indeed, a clearance may even develop between the shield 44 and the surface 19 of its overhang 18. The absence of a contact reduces the torque imposed by the seals B, yet does not significantly diminish the effectiveness of the barriers created by the shields 44. In this regard, the shields 44, by cooperating with the overhangs 18 serve to exclude dirt and water spray from the annular cavity 38 of the bearing B.

The absence of contact between each shield 44 and the surface 19 of its overhang 18 may derive from abrasion or from a permanent set in the elastomer or from both. In this regard, the shield 44 may be molded from an elastomeric material having relatively low resistance to abrasion. This characteristic causes the material to wear or abrade significantly during the first hour or two of operation, and after no more than about 24 hours of operation, the shield 44 will no longer contact the surface 19 of the overhang 18 or else will bear against it with only a very light force. On the other hand, the shield 44 may be molded from an elastomer which has a high compression-set. This characteristic allows the elastomer to revert to its original shape when deflected momentarily, but when distorted for substantial periods of time, it assumes its distorted configuration. Thus, when the shield 44 is deflected by the overhang 18 during the assembly procedure and, thereafter, allowed to remain deflected, the shield 44 assumes its deflected configuration and bears with little or no force on the surface 19 of the overhang 18.

The deep groove 66 between the dirt lip 62 of the seal element 42 and the oblique portion 56 of the seal case 40 contains a ring 96 of grease which serves as yet another barrier to the ingress of contaminants into the cavity 38 of the bearing A. During assembly, the groove 66 is preferably packed with grease—indeed, an oversupply of grease. Upon installing of bearing A with its seals B on the axle journal 2, the grease in the grooves 66 of the two seals B will deform against and spread along the radial surfaces 16 of the cone backing ring 8 and end cap 10, thus creating the grease rings 96 which form additional barriers between the seals B, on one hand, and the backing ring 8 and end cap 10, on the other. In time, the rings 96 of grease pick up dirt which causes the grease to stiffen and thus improve the stability of the rings 96.

When the journal assembly J and its bearing A are placed in operation, the cones 26, the wear rings 14, the backing ring 8, and the end cap 10, all rotate relative to the cup 20, which remains with the containing structure 6. The tapered rollers 34 tend to pump some of the lubricant toward the thrust ribs 30 of the two cones 26 and onto sealing surfaces 15 of the wear rings 14. This lubricant, encounters the primary lip 60 of each seal element 42 and when not in excessive quantities, is for the most part returned toward the tapered rollers 34 and the annular cavity 38 in which they revolve. In particular, upon migrating along the sealing surface 15 on the wear ring 14 beyond either cone 26, the lubricant becomes caught in the pumping cavities 76 of the primary lip 60 for the seal B at that end of the bearing A, and here the side faces 78 of the cavities 76, inasmuch as they are oblique to the direction k of relative rotation, drive the lubricant axially back toward the sealed cavity 38. The centrifugal force that is developed tends to fling the lubricant out into the pumping cavities 76 where it is deflected or impelled axially by the side faces 78 and the connecting faces 80.

A very small quantity of the lubricant works its way under the cylindrical face 70 of the primary lip 60, or perhaps through the vent apertures 82 in that lip, and passes on to the edge 88 of the dirt lip 62 to reduce the friction between that edge and the sealing surface 15 of the wear ring 14. The dirt lip 62 serves primarily to exclude dirt, moisture, and other contaminants from the sealed cavity 38, so that the raceways 22 and 28 and the rollers 34 in that cavity are not damaged by such contaminants. In addition, the dirt lip 62 creates a back pressure when lubricant migrates into the area under the cylindrical face 70 of the primary lip 60. This back pressure minimizes the amount of lubricant that can enter this area and forces some of the lubricant into engagement with the pumping cavities 76, resulting in the return of the lubricant to the sealed cavity 38. During starts and stops in operation and also when the speed rotation is so slow that the pumping cavities 76 are ineffective in returning the lubricant to sealed cavity 38, the shallow groove 64 adjacent to the dirt lip 62 partially fills with lubricant, which provides lubrication to sealing edge 88 of the dirt lip 62 when the speed of rotation increases.

The overhangs 18, of course, rotate with the backing ring 8 and end cap 10 of which they are a part, and they tend to deflict water and other contaminants which come in contact with them away from the bearing A simply by reason of the centrifugal force generated through their rotation. Some water and other contaminants will work under the overhangs 18, that is, into the spaces surrounded by the overhangs 18, but these contaminants encounter the shields 44, which to a large measure prevent further ingress. Of course, any contaminants which pass by the shield 44 must further transverse the ring 96 of grease and the dirt lip 60 before entering the annular cavity 38 of the bearing A.

Thus, the seals B effectively isolate the interior of the bearing A, keeping the lubricant within that interior and excluding contaminants.

A modified seal C (FIG. 7) is quite similar to the seal B, and as such has a case 100, a seal element 102 and spray shield 104. The case 100 is virtually identical to the case 40, except that it has apertures 106 at the bend where its intermediate portion 52 and radial portion 54 merge. The sealing element 102, likewise, resembles the sealing element 42 in that it has a primarily lip 60 provided with pumping cavities 76 and a dirt lip 62. The spray shield 104 is quite similar to the spray shield 44 in that, as manufactured, it projects radially beyond the intermediate portion 52 of the case 100 to a diameter greater than the inwardly presented surface 19 of the overhang 18. The overhang 18 accordingly deflects the shield 104 when, during assembly, the seal C is fitted into the overhang 18, as occurs when the overhang 18 is on the backing ring 8, or is fitted around the seal C as occurs when the overhang 18 is on the end cap 10.

Figure 7:
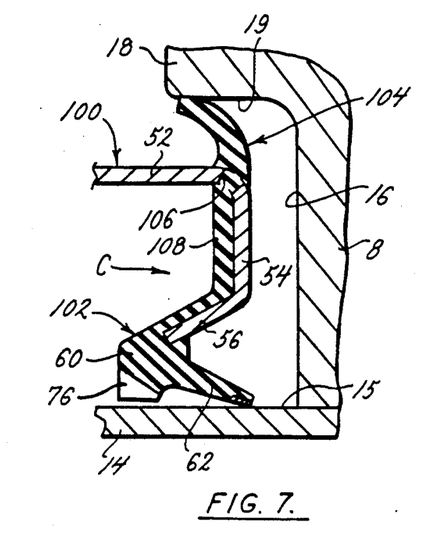
FIG. 7 is a fragmentary sectional view of a modified seal.

The primary difference between the seal B and the seal C resides in the unification of the bal element 102 and shield 104 in the latter. To this end, the seal element 102 and shield 104 are molded as a single unit to the seal case 100, bonding primarily to its radial portion 54 and the oblique portion 56. The seal element 102 and shield 104 are joined through a web 108 which extends along the inside face of the radial portion 54, to which it is bonded, and connects with the spray shield 104 through the apertures 106 in the case 100.

On either one of the seals B or C, the primary lip 60 need not be a pumping labyrinth but, instead, may be a simple labyrinth which does not pump the lubricant toward the cavity 38, yet creates a barrier along the wear ring 14, nonetheless. Indeed, the primary lip 60 need not be a labyrinth at all, for it could be a contacting lip seal which bears against the sealing surface 15 of the wear ring 14, it being supported on that surface by an elastohydrodynamic oil film. Where a contacting lip seal is employed, it may be urged against the sealing surface 18 by a typical garter spring. However, where a contacting lip seal is substituted for a labyrinth at the location of the primary lip 60, the seal B or C will impose higher torque on the journal 2.

The dirt lip 62, which contacts the sealing surface 15 of the wear ring 14, may be replaced by a labyrinth or omitted.

This invention is intended to cover all changes and modifications of the example of the invention herein chosen for purposes of the disclosure which do not constitute departures from the spirit and scope of the invention.

What is claimed is:

1. In combination with a circular sealing surface which is located around an axis of rotation with its center at the axis and an overhang which extends around the sealing surface concentrically with respect to that surface, yet is spaced outwardly from the surface and is fixed in position with respect to it,. an improved bal for establishing a barrier along the sealing surface and overhang while relative rotation occurs between the sealing surface and the seal, said seal comprising: a generally rigid case mounted concentrically with respect to the sealing surface, yet such that relative rotation can occur between the sealing surface and case; a first lip carried by the case and being presented toward and along the sealing surface to create a barrier to the passage of lubricant along the sealing surface, the first lip having an end face which is located at a substantial angle with respect to the axis of rotation and a circumferential face which is presented around and toward the sealing surface and intersects the end face at an edge, the circumferential face being generally separated form the sealing surface, the first lip having pumping cavities which open out of the end face and the circumferential face and interrupt the edge, the cavities being configured to impel lubricant which enters them generally axially in the direction toward which the cavities open out of the end face when relative rotation occurs between the sealing surface and seal; and a flexible shield carried by the case and directed outwardly away from the axis and toward the overhang, the shield having been deflected by the overhang as a result of the insertion of the seal into the overhang or the installation of the overhang around the seal and being along the overhang to establish a barrier to the passage of contaminants along the inwardly presented face of the overhang, the shield being formed form an elastomer that has low resistance to abrasion, the shield having been abraded significantly by the overhang to the extent that it does not contact the overhang or else bears against the overhang with a very light force, whereby the shield conforms generally to the inwardly presented surface of the overhang.

2. The combination according to claim 1 wherein the shield is initially directed substantially radially with respect to the axis.

3. The combination according to claim 1 wherein the seal further includes a second lip carried by the case and presented toward the sealing surface to form another barrier along the sealing surface.

4. The combination according to claim 3 wherein the second lip actually contacts the sealing surface.

5. The combination according to claim 3 wherein the first and second lips and the shield are all formed from an elastomer and are united as a single elastomer molding that is attached to the case.

6. The combination according to claim 1 wherein there extends between the overhang and the sealing surface a generally radial surface, and further comprising a ring of grease between the seal and the radial surface.

7. The combination according to claim 6 wherein the seal has an annular groove that opens toward the radial surface, and the ring of grease is in the annular groove.

8. A seal according to claim 1 wherein the shield resembles a flat washer prior to insertion into the overhang.

9. In combination with a circular sealing surface which is located around an axis of rotation with its center at the axis and an overhang which extends around the sealing surface concentrically with respect to that surface, yet is spaced outwardly from the surface and if fixed in position with respect to it, an improved seal for establishing a barrier along the saling surface and overhang while relative rotation occurs between the sealing surface and the seal, said seal comprising: a generally rigid case mounted concentrically with respect to the sealing surface, yet such that relative rotation can occur between the sealing surface and case; a first lip carried by the case and being presented toward and along the sealing surface to create a barrier to the passage of lubricant along the sealing surface, the first lip having an end face which is located at a substantial angle with respect to the axis of rotation and a circumferential face which is presented around and toward the sealing surface and intersects the end face at an edge, the circumferential face being generally separated form the sealing surface, the first lip having pumping cavities which open out of the end face and the circumferential face and interrupt the dive, the cavities being configured to impel lubricant which enters them generally axially in the direction toward which the cavities open out of the end face when relative rotation occurs between the sealing surface and seal; and a flexible shield carried by the case and directed outwardly away from the axis and toward the overhang, the shield having been deflected by the overhang as a result of the insertion of the seal into the overhang or the installation of the overhang around the seal and being along the overhang to establish a barrier to the passage of contaminants along the inwardly presented face of the overhang, the shield being formed from an elastomer having a high compression set which enables the shield to revert to its original shape when deflected momentarily, but causes it to assume a distorted configuration when deflected to and held in that distorted configuration for a substantial period of time, whereby the shield is permanently deformed generally in its deflected configuration.

10. The combination according to claim 9 wherein the shield is initially directed substantially radially with respect to the axis.

11. A seal according to claim 10 wherein the shield resembles a falt washer prior to insertion into the overhang.

12. The combination according to claim 9 wherein the seal further includes a second lip carried by the case and presented toward the sealing surface to form another barrier along the sealing surface.

13. The combination according to claim 12 wherein the second lip actually contacts the sealing surface.

14. The combination according to claim 12 wherein the first and second lips and the shield are all formed from an elastomer and are united as a single elastomer molding that is attached to the case.

15. The combination according to claim 9 wherein there extends between the overhang and the sealing surface a generally radial surface, and further comprising a ring of grease between the seal and the radial surface.

16. The combination according to claim 15 wherein the seal has an annular groove that opens toward the radial surface, and the ring of grease is in the annular groove.

17. In combination with a circular sealing surface which is located around an axis of rotation with its center at the axis and an overhang which extends around the sealing surface concentrically with respect to that surface, yet is spaced outwardly from the surface and is fixed in position with respect to it, an improved seal for establishing a barrier along the sealing surface and overhang while relative rotation occurs between the sealing surface and the seal, said seal comprising: a generally rigid case mounted concentrically with respect to the sealing surface yet such that relative rotation can occur between the sealing surface and case; a first lip carried by the case and being presented toward and along the sealing surface to create a barrier to the passage of lubricant along the sealing surface; and a flexible shield carried by the case and directed outwardly away from the axis and toward the overhang, the shield being formed from an elastomer that has a low resistance to abrasion, the shield having been deflected by the overhang as a result of the insertion of the seal into the overhand or the installation of the overhang around the seal and having been abraded by the overhang to the extent that it does not contact the overhang or else bears against the overhang with only a very light force.

18. In combination with a circular sealing surface which is located around an axis of rotation with its center at the axis and an overhang which extends around the sealing surface concentrically with respect to that surface, yet is spaced outwardly from the surface and is fixed in position with respect to it, an improved sealing for establishing a barrier along the sealing surface and overhang while relative rotation occurs between the sealing surface and he seal, said seal comprising: a generally rigid case mounted concentrically with respect to the sealing surface, yet such that relative rotation can occur between the sealing surface and case; a first lip carried by the case and being presented toward and along the sealing surface to create a barrier to the passage of lubricant along the sealing surface to create a barrier to the passage of lubricant along the sealing surface; and a flexible shield carried by the case and directed outwardly away from the axis and toward the overhang, the shield being formed from an elastomer that has a high compression set which enables it to revert to its original shape when deflected momentarily, but causes it to assume a distorted configuration when deflected to and held in that distorted configuration for a substantial time, the shield having been deflected by the overhang as a result of the insertion of the seal into the overhang or the installation of the overhang around the seal and having assumed its deflected configuration so that it bears with little or no force against the overhang.

* * * * *

UNITED STATES PATENT AND TRADEMARK OFFICE
CERTIFICATE OF CORRECTION

PATENT NO. : 5,024,449

DATED : Jun. 18, 1991

INVENTOR(S) : Dennis L. Otto

It is certified that error appears in the above-identified patent and that said Letters Patent is hereby corrected as shown below:

Col. 6, line 33 - After "ance" insert --- c ---.

Col. 6, line 56 - Delete "wather" and insert --- washer ---.

Col. 7, line 50 - Between "compression" and "set", delete the hyphen.

Col. 9, line 17 - Delete "bal" and insert --- seal ---.

Col. 9, line 55 (Claim 1) - Delete "bal" and insert --- seal ---.

Col. 10, line 15 (Claim 1) - Delete "form" and insert --- from ---.

Col. 10, line 33 (Claim 5) - Delete the second occurrence, "elastomer" and insert --- elastomic ---.

Col. 10, line 51 (Claim 9) - Delete "if" and insert --- is ---.

Col. 10, line 52 (Claim 9) - Delete "saling" and insert --- sealing ---.

Col. 10, line 68 (Claim 9) - Delete "dive" and insert --- edge ---.

UNITED STATES PATENT AND TRADEMARK OFFICE
CERTIFICATE OF CORRECTION

PATENT NO. : 5,024,449
DATED : Jun. 18, 1991
INVENTOR(S) : Dennis L. Otto

It is certified that error appears in the above-identified patent and that said Letters Patent is hereby corrected as shown below:

Col. 11, line 24 (Claim 11) - Delete "falt" and insert
    --- flat ---.

Col. 11, line 34 (Claim 14) - Delete second occurrence, "elastomer" and insert --- elastomic ---.

Col. 12, line 5 (Claim 17) - After "surface", insert (a coma)
    --- , ---.

Col. 12, line 15 (Claim 17) - Delete "overhand" and insert
    --- overhang ---.

Signed and Sealed this

Twenty-fourth Day of November, 1992

Attest:

DOUGLAS B. COMER

*Attesting Officer*      *Acting Commissioner of Patents and Trademarks*